United States Patent
Zievers et al.

[11] Patent Number: 5,209,844
[45] Date of Patent: May 11, 1993

[54] HOT GAS FILTER WITH JET PULSE CLEANING

[76] Inventors: James F. Zievers; Elizabeth C. Zievers, both of 1240 Carriage La., LaGrange, Ill. 60525; Peter Aguilar, 1238 S. 55th Ct., Cicero, Ill. 60650; Paul Eggerstedt, 25054 W. Pauline Dr., Plainfield, Ill. 60544

[21] Appl. No.: 741,956

[22] Filed: Aug. 8, 1991

[51] Int. Cl.⁵ .................... B01D 29/39; B01D 29/68
[52] U.S. Cl. .......................... 210/232; 210/323.2; 210/333.01; 210/411; 210/510.1
[58] Field of Search ............ 210/323.2, 332, 333.01, 210/409, 411, 412, 232, 510.1

[56] References Cited

U.S. PATENT DOCUMENTS

| | | | |
|---|---|---|---|
| 4,525,274 | 6/1985 | Willus et al. | 210/323.2 |
| 4,632,756 | 12/1986 | Caplan et al. | 210/323.2 |
| 4,781,825 | 11/1988 | Grimes et al. | 210/323.2 |
| 4,975,189 | 12/1990 | Liszka | 210/333.01 |
| 5,074,999 | 12/1991 | Drori | 210/333.01 |

Primary Examiner—Robert A. Dawson
Assistant Examiner—W. L. Millard
Attorney, Agent, or Firm—Edmond T. Patnaude

[57] ABSTRACT

A combined hold-down and manifold member is formed of ceramic and holds a plurality of candle filters in sealing engagement with a ceramic tube sheet from which the filters are supported. The hold-down and manifold member supports a plurality of gas nozzles over the open ends of the candle filters to direct pulses of cleaning gas into the filters.

10 Claims, 4 Drawing Sheets

HOT GAS FILTER WITH JET PULSE CLEANING

The present invention relates in general to the filtration of hot gasses, and it relates in particular to a new and improved candle filter in which pulses of high velocity gas are fed through a filter element hold-down member to a plurality of nozzles from which the gas is respectively injected into the filter elements to cause a brief reverse flow of gas through the filter elements to dislodge particulates which had been collected on the outside surface thereof.

BACKGROUND OF THE INVENTION

Candle filters generally employ a plurality of tubular filter elements which are closed at one end and are supported in a filter tank by a tube sheet from which they depend from into a filter chamber into which a fluid to be filtered is supplied under pressure. The filter candles are porous tubular members which are closed at the bottom and open at the top, and as the fluid flows from the filter chamber through the filter elements to a chamber above the tube sheet, solids which are entrained in the fluid are collected on the outside surfaces of the filter elements while the cleaned fluid flows out of the filter tank from the chamber in the upper part of the tank above the tube sheet. The filter elements extend through holes in the filter sheet and may be held in place in the filter sheet by many different devices including hold-down plates which are suitably mounted to the tops of the tube sheet over the tops of the filter elements.

One method of removing the solids which are deposited on the outer surfaces of the filter elements is to reverse the flow of fluid through the filter elements to dislodge the particles which had been deposited on the outside surfaces of the filter elements. This has been done without interrupting the operation of the filter by directing high pressure pulses of fluid into the interiors of the filter elements while the filter chamber remains pressurized. Various types of manifold designs have been used to the mount individual nozzles at the tops of the filter elements and to carry the high pressure fluid pulses to the nozzles. Where a large number of filter elements are used, the manifold designs become complex and are very expensive, particularly where the material from which the manifolds are made must withstand high temperatures of 1800 degrees Fahrenheit or more.

SUMMARY OF THE INVENTION

Briefly, in accordance with the present invention there is provided a new and improved candle filter wherein a hold-down plate is used to hold a plurality of filter elements in place in the tube sheet. A network of cleaning fluid carrying passageways extend through the hold-down plate and connect to a plurality of nozzles which are themselves mounted to the hold-down plate and respectively open into the open tops of the filter elements.

Preferably, when the filter is to be used for the filtration of hot gasses, the hold-down plate is a light-weight ceramic member which consists of a skeleton of ceramic fibers in which the interstices are filled with a ceramic material to provide a light-weight non-porous ceramic member.

In one embodiment of the invention the cleaning fluid passageways are drilled through the hold-down plate in parallel relationship to the plane of the plate, and the nozzle members are mounted in intersecting drilled holes in the plate. In another embodiment of the invention, a plurality of nozzle support and hold-down members are affixed to and form a part of the tube sheet.

GENERAL DESCRIPTION OF THE DRAWINGS

The present invention will be better understood from a reading of the following detailed description taken in connection with the accompanying drawings wherein.

DETAILED DESCRIPTION OF A PREFERRED EMBODIMENT

Figure 1:
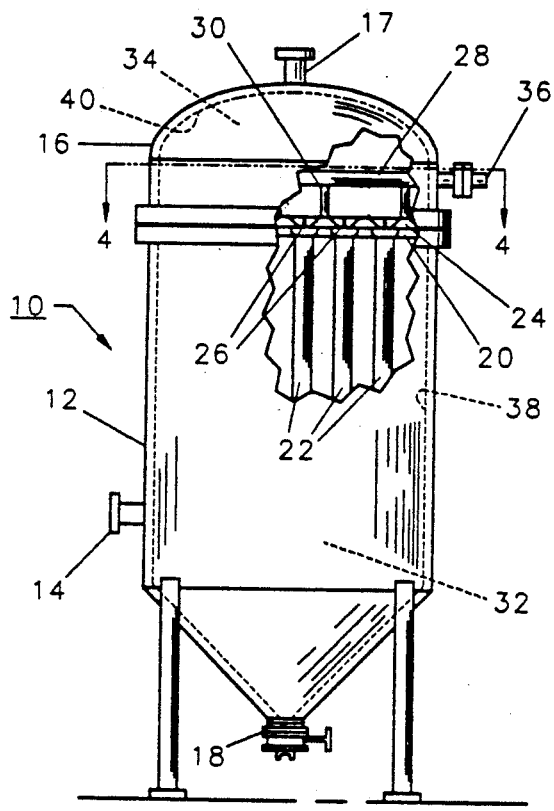
FIG. 1 is an elevational view of a candle filter embodying the present invention, a portion of the tank thereof being broken away to shown the manner in which the individual filter elements are mounted in the tank.

Referring to FIG. 1 wherein is shown a filter 10 comprising as its principal parts, a generally cylindrical tank 12 having an open top and a conical bottom portion with a fluid inlet 14 in the side thereof, a cover 16 sealable mounted over the top of the tank 12 and having a fluid outlet 17 therein, a drain opening and associated valve 18 at the bottom of the tank 12, a rigid, gas impervious tube sheet 20 from which a plurality of filter elements 22 depend, a hold-down plate 24 disposed across the top of the tube sheet 20, a plurality of nozzle members 26 respectively disposed over the tops of each of the filter elements 22, and a cleaning fluid inlet manifold 28 connected by means of a plurality of conduits 30 to a plurality of interior passageways in the hold-down plate 24, not visible in FIG. 1, to which the nozzle members 26 are respectively connected.

In operation, the fluid to be filtered is supplied under pressure to a filter chamber 32 through the inlet 14. The filter elements 22 are of the type known as candle filters. They are porous, tubular members which are closed at the bottom and open at the top. The fluid to be filtered thus flows from the chamber 32 below the tube sheet into the respective filter elements 22 through the walls thereof and the filtered fluid flows from the interiors of the filter elements into a chamber 34 located in the cover 16 above the tube sheet from which it exits the filter through the outlet 17. As the fluid into the filter elements solids entrained in the fluid are deposited on the outer surfaces of the filter elements, and in order to maintain the operating efficiency of the filter the solids must be removed periodically.

In order to remove the particles which had collected on the outer surfaces of the filter elements 22, pulses of fluid at a pressure greatly exceeding the pressure in the chamber 32 are supplied to the cleaning fluid manifold 28 through an inlet 36. These high pressure pulses are conducted through the pipes 30 and internal passageways in the hold-down sheet 24 to the plurality of nozzles 26 from which the pulses of gas are directed down into the filter elements 22. The high pressure fluid pulses dislodge the particles which had been deposited on the outer surface portions of the filter elements, and the particles fall to the conical bottom portion of the chamber 32 where they collect and are periodically removed from the filter tank 12 through the drain valve 18.

Figure 2:
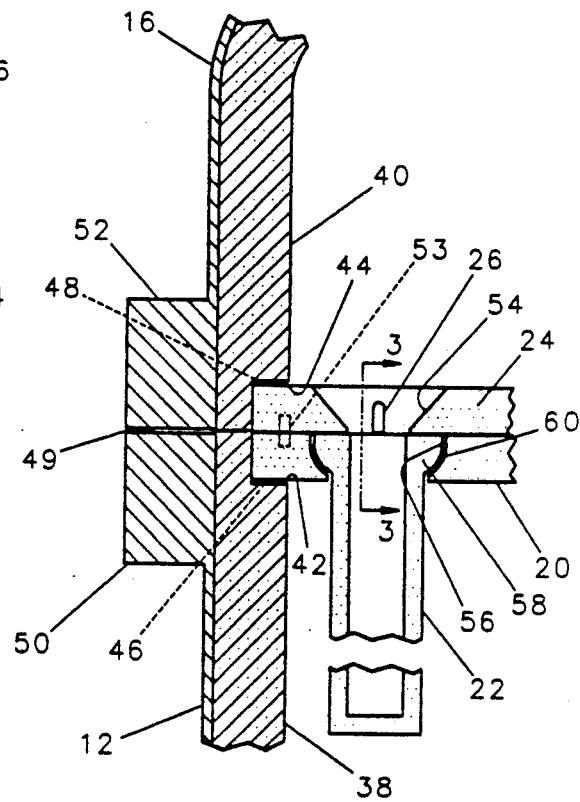
FIG. 2 is a fragmentary cross-sectional view of a portion of the filter of FIG. 1 particularly showing the manner in which a tube sheet and an associated hold-down plate are mounted in the filter tank.
Figure 3:
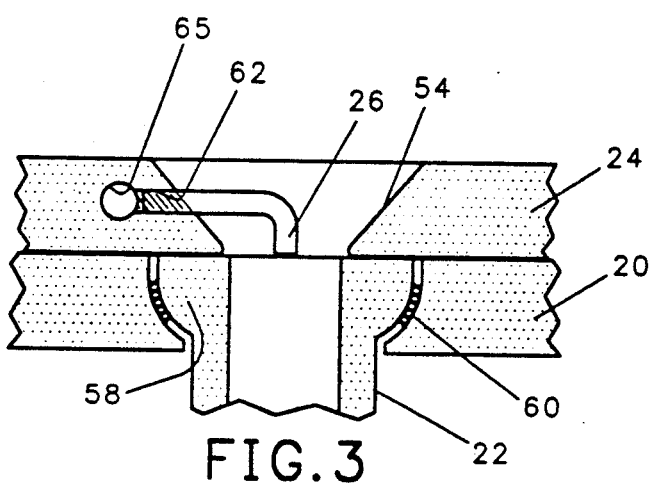
FIG. 3 is a fragmentary cross-sectional view of the tube sheet, one filter element and the hold-down plate taken along the line 3—3 in FIG. 2.

Referring to FIGS. 2 and 3, it will be seen that the tank 12 and the cover 16 are lined with layers 38 and 40 of a refractory material such as ceramic, and the respective layers 38 and 40 are provided with annular rabbets 42 and 44 in which the peripheral portions of the tube sheet 20 and the hold-down plate 24 are disposed and pressed together when the cover 16 is tightened down onto the tank 12. Suitable gaskets 46 and 48 are positioned between the tube sheet 20 and the hold-down plate 24 and the refractory liners 38 and 40, and an annular gasket 49 is positioned between two opposing annular flanges 50 and 52 on the tank 12 and the cover 16. A plurality of conventional locator pins 53 are positioned in blind holes in the top of the sheet 20 and the bottom of the sheet 24 to assure that a plurality of through holes 54 in the hold-down sheet 24 are aligned with a plurality of through holes 56 in the tube sheet 20. As may be seen, the filter elements 22 are each provided with an external annular flange 58 which fits into the counterbored upper end of the associated one of the holes 56 in the tube sheet 20 to support the filter elements in position in the filter tank 12. A plurality of annular gaskets are compressed between the tube sheet 20 and the flanges 58 on the filter elements 22 to prevent any fluid from bypassing the filter elements 22.

The holes 54 in the hold-down sheet 24 are inwardly tapered toward the tube sheet 20 so as to provide a venturi action when the high pressure, high velocity pulses of cleaning fluid are emitted into the filter elements 22 through the nozzles 26. In this way, additional fluid is educted from the upper chamber 34 as the high velocity pulse of fluid exits the nozzle, thereby to increase the mass of fluid which flows in a reverse direction through the filter elements during the filter cleaning operation.

As best shown in FIG. 3, it may be seen that each of the nozzle members is a tubular member which is externally threaded at one end and screwed into a hole 62 which extends between the opening 54 and a passageway 65 which extends through the hold-down plate 24 and is connected to a plurality of the holes 62 to the nozzle members 26. The threads on the nozzles are preferably self tapping in nature so as to facilitate assembly of the nozzles to the hold-down plate 24.

Figure 4:
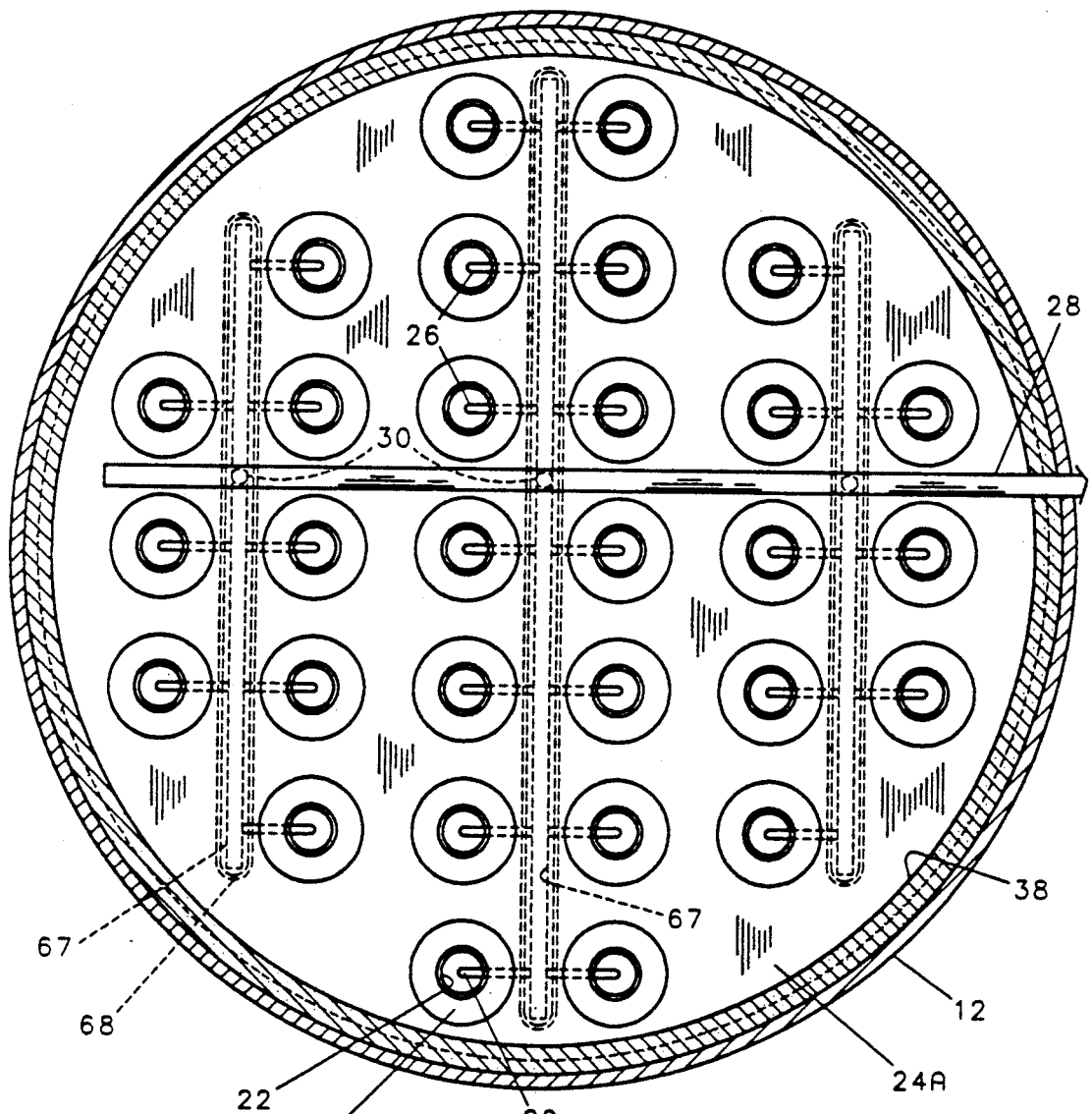
FIG. 4 is a cross-sectional view taken along the line 4—4 of FIG. 1 showing the arrangement of the filter elements in the filter tank.
Figure 5:
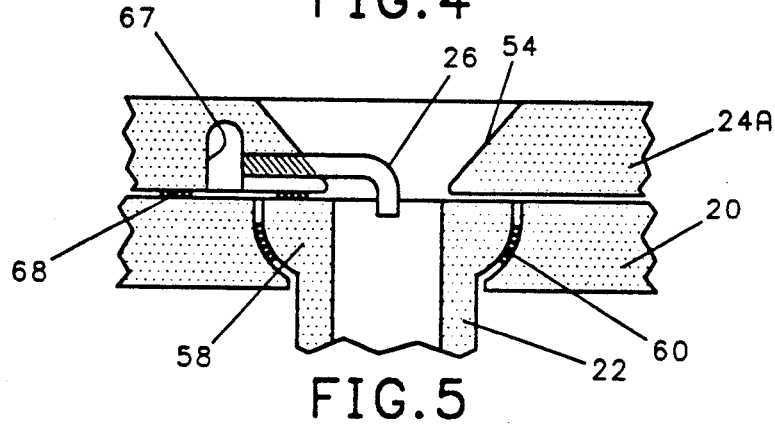
FIG. 5 is a fragmentary cross-sectional view similar to that of FIG. 3, but showing a different embodiment of the invention.

Referring to FIGS. 4 and 5, there is shown another way in which the hold-down plate is provided with the manifold passageways. As there shown, a filter element 22 is mounted in the tube sheet 20 in the same way as shown in the embodiment of FIG. 3, and in FIGS. 4 and 5 like parts are identified by the same reference numbers as in FIG. 3. The hold-down plate is identified by the reference number 24a, and the passageways therethrough which carry the fluid pulses to the nozzle members 26 are closed end grooves 67 which are routed or molded in the bottom face of the hold-down plate 24a. The grooves 67 are each surrounded by a continuous seal 68 whereby the passageway for carrying the cleaning fluid is defined by the wall of the groove 67, and the space between the hold-down plate and the tube sheet which is located between the inner edges of the seal 68 which surrounds the groove 67. As may be seen in FIG. 4, each of the grooves 67 is a part of the manifold and is connected to a plurality of the nozzles 26. If desired, the seals 68 may be compressible gaskets or they may be constituted by a continuous line of cement so that the hold-down plate 24a is affixed to the tube sheet 20, thereby permitting the filter elements, the tube sheet, and the hold-down sheet together with the nozzle members 26 may be assembled outside of the tank 12 and subsequently lowered into the tank 12 as a complete subassembly.

Figure 6:
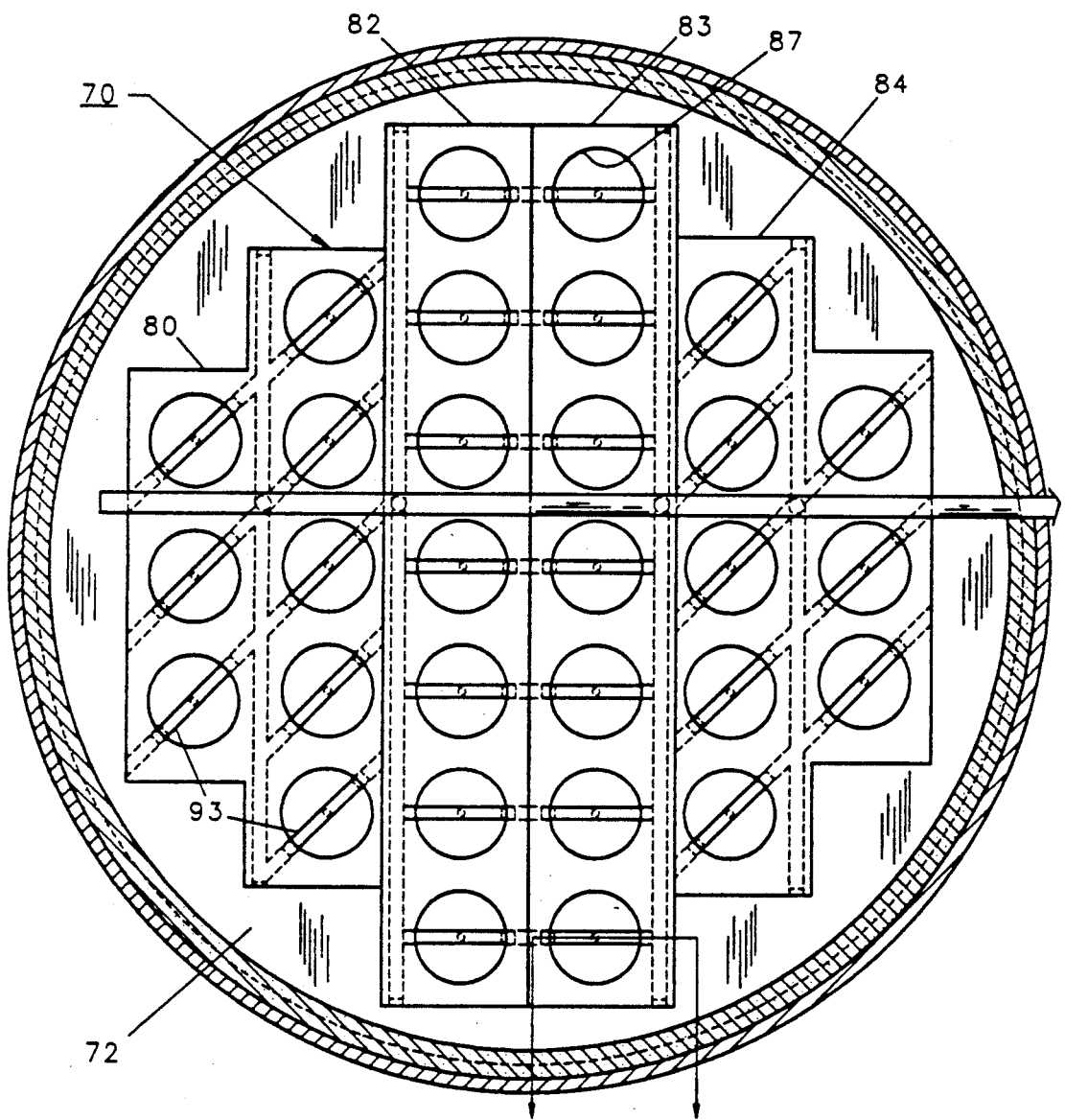
FIG. 6 is a plan view of an alternative filter element hold-down construction embodying the present invention.
Figure 7:
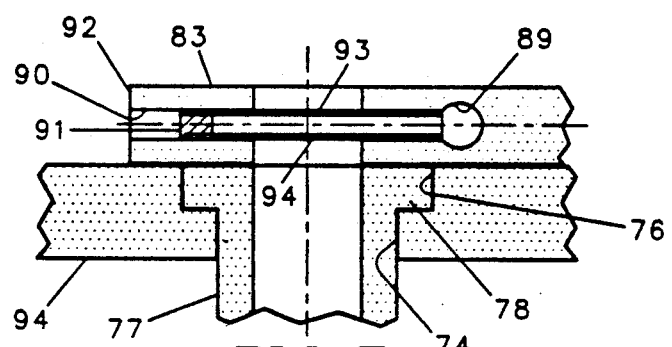
FIG. 7 is a fragmentary cross-sectional view taken along the line 7—7 of FIG. 7 to shown one of the nozzle members and the manner in which it is mounted to the associated hold-down member.
Figure 8:
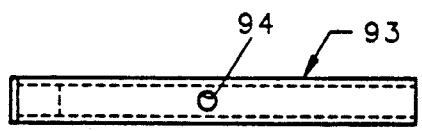
FIG. 8 is a bottom view of the nozzle member shown in FIGS. 6 and 7.
Figure 13:
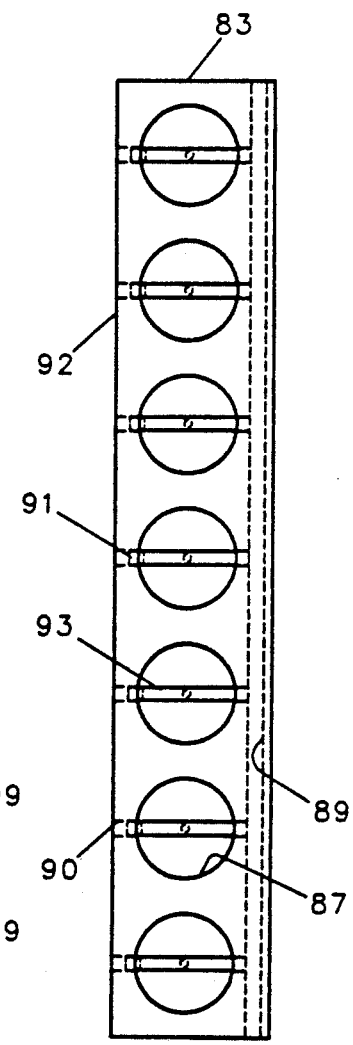
FIG. 13 is a plan view of still another hold-down module including a plurality of nozzle members and associated passageways.

Referring particularly to FIGS. 6 and 7, there is shown still another embodiment of the invention wherein a combined hold-down plate and tube sheet 70 is an assembly of separate ceramic fiber pieces cemented together into a unitary part. The assembly 70 comprises a circular tube sheet 72 member having a plurality of through holes 74 each having a counterbore 76 at the top into which the upper end portion of a candle filter element 77 is positioned with an annular external flange 78 at the top of the filter element 77 fitted into the counterbore 76. A plurality of rectilinear fiber ceramic modules 80, 82, 83, and 84, are cemented to the top of the tube sheet 72 over the holes 74. Each of the modules 80, 82, 83, and 84, is provided with a plurality of through holes 87 which are respectively aligned with the holes 74 in the sheet 72. As shown in FIG. 13, the module 83 is each provided with seven such through holes 87 and an elongate rectilinear passageway 89 extends along side the holes 87 and is connected to each of the holes 87 by transverse holes 90 which are drilled from the side 92 to the common passageway 89. A plurality of nozzle members 93 are tightly fitted into the holes 90. The nozzle members 93 are tubular and each has a sealing plug 91 at one end which completely seals the nozzle from the ambient and with the opposite end being open and connecting to the passageway 89 to carry cleaning fluid from the passageway 89 to an orifice 94 in the side of the nozzle member 93 to direct a jet of cleaning fluid down into the associated filter element 77.

Figure 9:
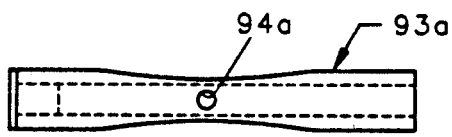
FIG. 9 is a view similar to that of FIG. 8 showing the bottom side of an alternative nozzle design.

In FIG. 9 there is shown an alternative nozzle member 93a having a necked down central section of reduced external diameter to reduce the resistance of the nozzle member to the flow of fluid from the filter elements to the fluid outlet during normal operation of the filter. The nozzle member 93a has a centrally disposed, circular orifice 94a on the bottom side thereof.

Figure 10:
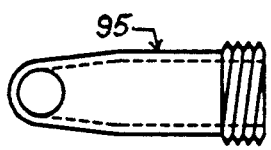
FIG. 10 is a view similar to that of FIG. 9 showing the bottom side of still another nozzle design.

As shown in FIG. 10, a generally tubular nozzle member 95 has a tapered closed end portion with a convex external shape and is provided with an orifice in the bottom for directing cleaning gas into an associated filter candle. The member 95 is externally threaded at the opposite open end for facilitate mounting in the associated hold-down plate by screwing the nozzle into a pre-drilled hole in the plate. The thread can be eliminated, if desired, and in that case the nozzle member 95 is cemented in place in the hole in the associated hold-down plate.

Figure 11:
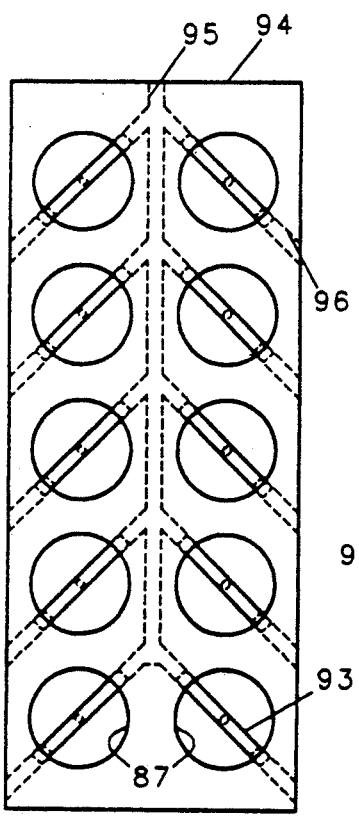
FIG. 11 is a plan view of a portion of a hold-down module having a plurality of nozzle members and associated passageways mounted in one particular layout.
Figure 12:
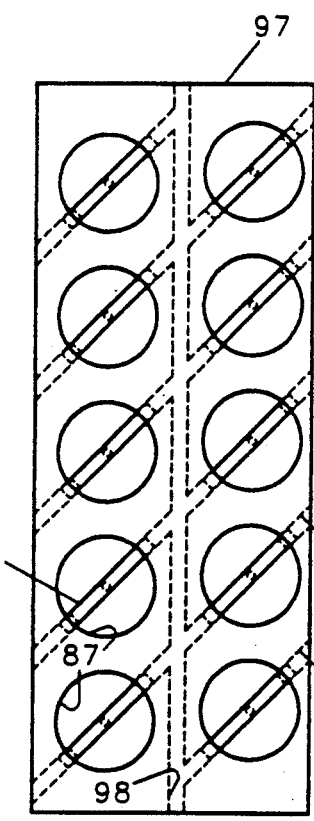
FIG. 12 is a plan view of another hold-down module including a plurality of nozzle members and associated passageways.

Referring to FIGS. 11 and 12, parts of the modules 94 and 97 can be cut away to provide for a lesser number of nozzle members as, for example, where sets of five and three nozzle members are required as shown in FIG. 6. It will be noted that the modules shown in FIGS. 11, 12, and 13 are symmetrical about the central horizontal plane thereof to permit them to be inverted for a wider range of design uses. For example, two of the modules 83 shown in FIG. 13 are used in the assembly 70. Also one of the modules 97 with two of the end sections removed provide the module 80 and another one of the modules 97 with the other two of the end sections removed provides the module 84 in the assembly 70 shown in FIG. 6.

The hold-down plate can be manufactured by initially forming a skeletal member formed of ceramic fibers bonded together at the places of intersection of the fibers. The skeletal member can be vacuum formed by drawing an aqueous slurry of the ceramic fibers and a bonding material through a perforate plate. In some cases, two such plates can be arranged in spaced face-to-face relationship whereby the skeletal member is formed between the two plates. After drying, the skeletal member is soaked in an aqueous solution of colloidal silica to completely fill the interstices of the skeletal member with silica, The filled member is then dried to form a strong, rigid, yet light-weight, plate. In order to increase the resistance of the plate to corrosion and to strengthen the inner part thereof where the manifold passageways will subsequently drilled, the silica filled plate can be soaked in an aqueous solution of alpha alumina and again dried. Thereafter the holes and passageways can be drilled or machined in the plate to provide the final hold-down plate.

While the present invention has been described in connection with particular embodiments thereof, it will be understood that those skilled in the art may make many changes and modifications without departing from the true spirit and scope of the invention. Therefore, it is intended by the appended claims to cover all such changes and modifications which come within the true spirit and scope of the present invention.

What is claimed:

1. A filter for removing particulates from a fluid in which said particulates are entrained, comprising in combination, a filter tank having a fluid inlet and a fluid outlet,
    a support member extending across said tank to separate said tank into first and second chambers,
    said fluid inlet opening into said first chamber and said fluid outlet opening into said second chamber,
    a plurality of through holes in said support member,
    a plurality of porous tubular filter elements each having an open end and a closed end,
    said filter elements being respectively and sealably mounted in said holes and extending into said first chamber with said closed ends being disposed in said first chamber,
    a hold down member mounted over said open ends of said filter elements,
    a plurality of nozzle means mounted to said hold-down member and respectively disposed over said open ends of said filter elements for directing cleaning fluid into said filter elements,
    at least one manifold passageway extending through said support member,
    a plurality of branch passageways extending through said support member between said manifold passageway and said nozzle members,
    said hold-down member having a plurality of through holes aligned with said through holes in said support member through which fluid may flow from said filter elements into said second chamber.

2. The combination set forth in claim 1, wherein said nozzle members each comprises an elongate tubular member having an orifice in the side thereof,
    one end of said elongate tubular member being sealably closed, and
    the other end of said elongate tubular member being open and communicating with said manifold passageway,
    each of said elongate tubular members being mounted in a respective one of said branch passageways.

3. The combination set forth in claim 2, wherein
    said one end of said elongate tubular member extends into said hold-down member, and
    an intermediate portion of said elongate tubular member extends across the associated one of said through holes in said hold-down member.

4. The combination set forth in claim 3, wherein
    said intermediate portion of said elongate tubular member is necked down to reduce the resistance to the flow of fluid from the associated filter element to said second chamber.

5. The combination set forth in claim 4, wherein
    the necked down portion of said tube is generally elliptical in cross-section with the major diameter thereof lying parallel to the longitudinal axis of the associated filter element.

6. The combination set forth in claim 1, wherein
    said hold-down member is affixed to said support member.

7. The combination set forth in claim 6, wherein
    said support and said hold-down member are ceramic parts.

8. The combination set forth in claim 1, wherein
    said support member and said hold-down member are ceramic parts.

9. The combination set forth in claim 1, wherein said manifold passageway comprises,
    a groove in one face of said hold-down member,
    said hold-down member being mounted with said face adjacent said support member, and
    sealing means surrounding said groove and sealably engaging said support member and said hold-down member, thereby to seal said groove from the ambient.

10. In a pressure filter, the combination comprising a filter support member having a plurality of opening therethrough, a plurality of tubular filter elements respectively extending through said openings and supported by said member, said openings having a counterbore and each of said filter elements having at one end an external annular flange received in said counterbores, a hold-down means resting on said support member over said one end of each of said filter elements, conduit means extending through said hold-down means, a plurality of tubular nozzle means mounted to said hold-down means with passageways through said nozzle means communicating with said conduit means, said nozzle means opening at the ends thereof remote from said hold-down means toward the openings in said filter elements to direct pulses of gas supplied to said passageways to the interiors of said filter elements.

* * * * *